United States Patent
Schwaerzler

(10) Patent No.: US 6,505,119 B2
(45) Date of Patent: Jan. 7, 2003

(54) CONTROL UNIT AND MISSION PLANNING STATION FOR A MANNED PARAGLIDING SYSTEM

(75) Inventor: Hans-Juergen Schwaerzler, Taufkirchen (DE)

(73) Assignee: EADS Deutschland GmbH, Munich (DE)

( * ) Notice: Subject to any disclaimer, the term of this patent is extended or adjusted under 35 U.S.C. 154(b) by 12 days.

(21) Appl. No.: 09/840,066

(22) Filed: Apr. 24, 2001

(65) Prior Publication Data

US 2002/0003191 A1 Jan. 10, 2002

(30) Foreign Application Priority Data

Apr. 25, 2000 (DE) .......................................... 100 20 179

(51) Int. Cl.[7] ................................................. G05D 1/12
(52) U.S. Cl. ........................ 701/210; 244/151; 244/152
(58) Field of Search .......................... 701/210; 244/151, 244/152

(56) References Cited

U.S. PATENT DOCUMENTS 5,904,324 A * 5/1999 Di Bella ..................... 244/152

FOREIGN PATENT DOCUMENTS

| DE | 39 30 862 A1 | | 9/1989 |
|---|---|---|---|
| DE | 43 14 811 A1 | | 5/1993 |
| DE | 44 44 373 A1 | | 12/1994 |
| DE | 19704279 | * | 9/1998 |
| DE | 198 60 810 A1 | | 12/1998 |
| DE | 198 36 022 A1 | | 8/1999 |

* cited by examiner

Primary Examiner—William A. Cuchlinski, Jr.
Assistant Examiner—Marthe Y. Marc-Coleman
(74) Attorney, Agent, or Firm—Crowell & Moring LLP

(57) ABSTRACT

A mission control system has a control unit for a paragliding system for the manned paragliding flight and a mission planning station. A mission planning station establishes a three-dimensional flight program based on terrain data, properties of a paragliding system and atmospheric conditions and transmits this information to a control unit. The control unit includes of a navigational instrument for determining the current actual position, and a display which indicates current control commands based on the actual position and of the flight program and the control unit and the mission planning station.

9 Claims, 2 Drawing Sheets

CONTROL UNIT AND MISSION PLANNING STATION FOR A MANNED PARAGLIDING SYSTEM

BACKGROUND AND SUMMARY OF THE INVENTION

This application claims the priority of German patent document 100 20 179.2, filed Apr. 25 2000, the disclosure of which is expressly incorporated by reference herein.

The invention relates to a control unit for a paragliding system for a manned paragliding flight and to an associated mission planning station.

For certain military operations it is necessary for paragliding jumpers to be able to glide reliably toward and reach a predetermined target point. A known navigational aid for paragliding jumpers indicates, on the basis of a predetermined drop-off point from the airplane and a predetermined landing point, a straight flight path or a flight path composed of straight sections. The paragliding jumper carries a display device containing a computer into which the topographical data and the straight flight path can be input before the mission. The computer displays this data, for example, in the form of a terrain with a straight flight path that is marked on this background. In addition, the pilot is equipped with a GPS navigational system that establishes the current actual position of the paraglider. This current actual position is also processed by the computer and displayed on the two-dimensional representation of the terrain. The paragliding jumper directs the paraglider using the display of a desired straight flight path and a desired landing point in conjunction with the current actual position.

A disadvantage of the state of the art is that the jumper may be unable to reach the desired landing point if the landing point is at an unfavorable location in relation to the drop-off point, and if a disturbance variable not previously anticipated occurs.

Therefore, it is an object of the invention to provide a control unit for a paragliding system that is suitable, from an instrument-technical aspect, for paragliding missions, and that will take the paragliding jumper as reliably as possible to a desired landing point.

This and other objects and advantages are achieved by the paragliding control system according to the invention, which includes a flight guidance system for establishing preset control values based on actual position, and a flight program that can be input from a mission planning station. The flight guidance system also includes a display that indicates the current preset control values.

Other objects, advantages and novel features of the present invention will become apparent from the following detailed description of the invention when considered in conjunction with the accompanying drawings.

DETAILED DESCRIPTION OF THE DRAWINGS

Figure 1:
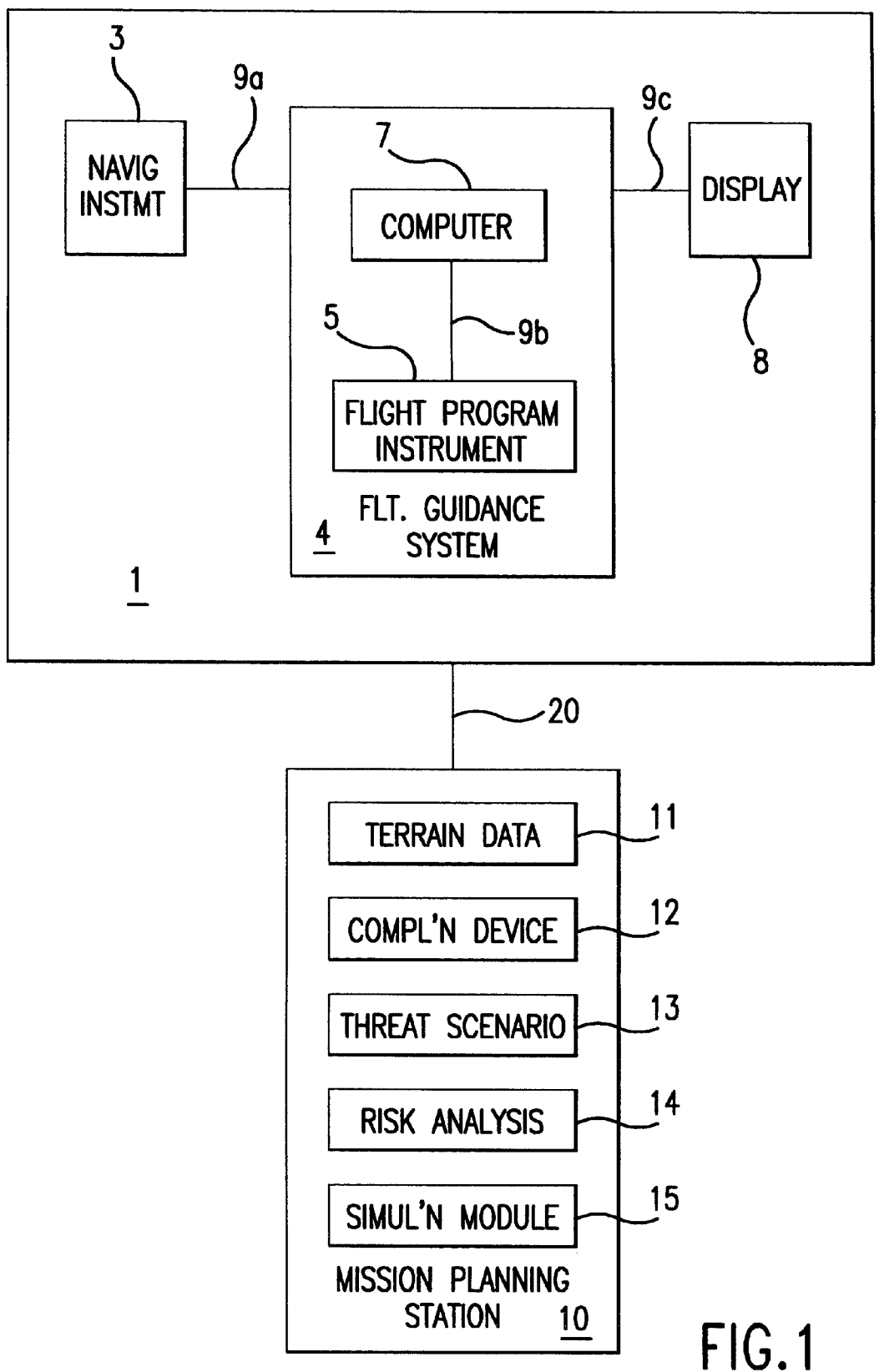
FIG. 1 is a block diagram of a first embodiment of the invention.

In the system according to the invention, the paragliding jumper carries a control unit 1 that consists of a navigational instrument 3, a flight guidance system 4 with a flight program instrument 5 and a computer 7 as well as a display 8. These instruments 3, 4, 5, 7, 8, which can be integrated (from an instrument-technical point of view) in different ways in accordance with the state of the art, conduct mutual data exchanges. In particular, the navigational instrument 3 is connected with the computer 7 via the line 9a, the flight program instrument 5 is connected with the computer 7 via the line 9b, and the computer 7 is connected with the display 8 via the line 9c.

A mission planning station 10 associated with the control unit 1 can be a ground station or an onboard station on the drop-off-plane. The mission planing station 10 consists of a terrain data base 11 that includes three-dimensional terrain and cultivation data as well as the corresponding functions and a computation device 12 allocated to the mission planning station. These components can be used to predetermine at least one landing point or several possible landing points, and also for calculating at least one drop-off point for the paraglider from the airplane. Furthermore, the computation device 12 contains data about the atmospheric conditions of the air space of the mission terrain. (In particular, the latter data describe the atmospheric altitude profile, such as wind directions and wind speeds per altitude, the air temperatures in the air space, and optionally a module for calculating and simulating cloud formations or icing risks.) The computation device 12 further contains parameters of the paragliding system. These include, in particular, critical limits of the paraglider based on its aerodynamic properties, e.g. gliding angle, ascending force correction values, rotational rates depending on the adjustment and load on the glider. The computation device 12 is able to determine, based on the parameters of the paragliding system and in connection with the atmospheric conditions, a range and flight paths.

Optionally, the mission planning station 10 contains a threat scenario module 13 that stores enemy threats as well as their levels of significance for a planned mission. Moreover, an analysis device can be envisioned there, which can be used, for example, on the basis of artificial intelligence, to optimize the flight paths in view of the threat or assessed threat and conjunction with alternative desired flight paths. In addition, a success/risk analysis module 14 can be provided in the mission planning station that assesses the risk and/or the probability of success when a paragliding jumper begins the flight based on an established desired flight path. A simulation module 15 can also be provided in the mission planning station 10 that can simulate the entire course of the mission.

One or more landing points are preset in the mission planning station 10. In the alternative, it is possible to establish several landing points including their allocated probability of success in the mission station 10. The mission planning station 10 also determines a drop-off point or several different drop-off points for preferred missions as well as the associated drop-off altitudes. In addition, the ground station 10 establishes one or more desired flight paths. According to the invention the determination of these desired preset values takes place on the basis of the three-dimensional terrain data, the critical limits and/or aerodynamic conditions of the paragliding system and the atmospheric conditions. In addition, the values from the threat scenario can also be incorporated in the calculation of the desired preset values. Since the entire air space of the mission terrain and the three-dimensional terrain data is available for the determination of the desired preset values, the mission planning station 10 establishes a three-dimensional desired flight path.

The data required for the mission are transmitted from the mission planning station 10 to the control unit 1. A line 20 may be provided for this purpose and can serve to input the relevant data into the control unit before the mission. This data transmission can also be carried out by the data medium or during a mission via radio communication. Preferably, data are input in the flight program instrument, which stores this data and feeds it to the computer 7 at the proper time. The navigational instrument 3 determines the actual position during the flight of the paragliding system. The determination of the actual position can be done using a satellite navigational instrument. Based on the actual position of the paragliding system and the relevant desired preset values, the computer 7 establishes navigational preset values for the paragliding jumper. These navigational preset values are transmitted to the display 8 via the line 9a.

The display 8 displays instructions that indicate to the paragliding jumper the direction to be targeted as well as braking operations to be initiated. These preset values can be displayed in the form of commands instructing the pilot to activate certain control lines in a certain manner. As an alternative or in addition, the display 8 can include a graphic representation of the desired control input. This display can be realized as a direct reading instrument with a pointer whose deviation from a middle position informs the pilot in an analogous way about the desired control input. This graphic representation can also be realized with colored lights; for example, a green light indicates a desired curve to the right, and a red light indicates a desired curve to the left, and a flashing of both lights prescribes a braking action.

Preferably, the control commands for the paragliding jumper relate to the horizontal plane of the paragliding system. However, it is also possible to show a profile of the desired flight path as well as of the actual path up until that time on the display. As a further option, the position of the paragliding system over the terrain or in the three-dimensional air space can be indicated on the display 8. This can be achieved with a two-dimensional or with a three-dimensional representation of the terrain and/or of the air space.

From an instrument-technical perspective the display 8 can be a monitor, a helm display, a sight vane, or other forms of display according to the state of the art. In particular, the actual position can be represented together with the desired flight path and/or with the terrain in the relevant air space in a two-dimensional or in a three-dimensional form.

Figure 2:
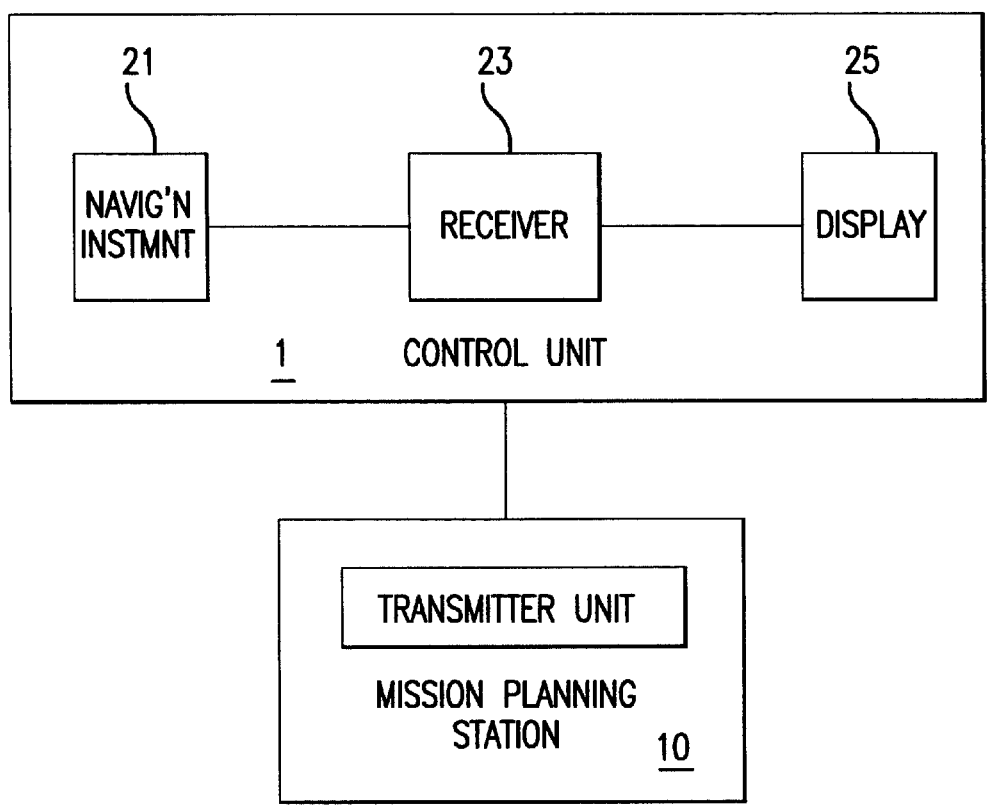
FIG. 2 is a block diagram of a second embodiment of the invention.

In the second embodied example of the flight guidance system according to the invention, as represented in FIG. 2, the equipment 1 of the jumper includes a navigational instrument 21, corresponding to the navigational instrument 3 in FIG. 1, a receiver station 23 and a display 25, corresponding to the display 8 in FIG. 1. In addition, in contrast to the ground station shown in FIG. 1, the mission planning station 10 also includes a receiver and transmitter unit 27. According to the example in FIG. 2, during a mission the actual position of the paragliding system is transmitted to the mission planning station 10 via radio communication. The mission planning station 10 transmits the relevant desired preset values in a timely fashion to the receiver station 23 of the jumper. The control commands are represented on the display 25 in the manner described.

The analysis unit may be in the form of a mission planning station 10 or as an onboard station in an airplane. The availability of an external mission planning station 10 has the advantage that the person in charge of the mission can monitor and evaluate the mission of one or more paragliding jumpers simultaneously. This allows an ongoing evaluation of the mission while in the threat scenario, during the flight of the paragliding systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit for a paragliding system for the manned paragliding flight, comprising:
    a navigational instrument for ascertaining current actual position of the paragliding system;
    a flight guidance system for establishing preset control values based on the actual position; and
    a flight program input from a mission planning station;
    wherein the flight guidance system also consists of a display that indicates current preset control values.

2. The control unit as claimed in claim 1, wherein the display also indicates a desired flight path.

3. The control unit as claimed in claim 1, wherein the display also indicates terrain.

4. The control unit as claimed in claim 1, wherein the display is three-dimensional.

5. The control unit as claimed in claim 1, wherein the display comprises a direct reading instrument with a pointer whose deviation from a middle position indicates a deviation from a desired flight path.

6. The control unit as claimed in claim 1, wherein the display comprises a monitor.

7. The control system as claimed in claim 1, wherein the display comprises one of a helm display and a sight vane.

8. A mission planning station for establishing a flight program for flight of a manned paragliding system, said mission planning station comprising:
    a module for terrain data; and
    a computation device;
    wherein the computation device contains three-dimensional atmospheric conditions of air space pertaining to said flight, including wind directions and wind speeds, properties of the paragliding system, and a module for calculating at least one drop-off point for the paragliding system from an airplane based on a preset landing point.

9. A mission system with a control unit for controlling flight of a manned paragliding system, comprising:
    a display for a paragliding jumper; and
    a mission planning station; wherein,
    the mission planning station determines a three-dimensional flight program based on terrain data, properties of the paragliding system and atmospheric conditions and transmits determined results to the control unit; and
    the control unit comprises a navigational device for determining current actual position of the paragliding jumper, and a display that indicates current control commands based on the actual position and the flight program.

* * * * *